United States Patent
Kumar et al.

(10) Patent No.: US 7,182,894 B2
(45) Date of Patent: Feb. 27, 2007

(54) PROCESS FOR THE PREPARATION OF FREE STANDING MEMBRANES

(75) Inventors: Pandian Senthil Kumar, Maharashtra (IN); Periasamy Selva Kannan, Maharashtra (IN); Arvind More, Maharashtra (IN); Rahul Shingte, Maharashtra (IN); Prakash Wadgaonkar, Maharashtra (IN); Murali Sastry, Maharashtra (IN)

(73) Assignee: Council of Scientific & Industrial Research, New Delhi (IN)

(*) Notice: Subject to any disclaimer, the term of this patent is extended or adjusted under 35 U.S.C. 154(b) by 493 days.

(21) Appl. No.: 10/799,442

(22) Filed: Mar. 12, 2004

(65) Prior Publication Data
US 2005/0199544 A1 Sep. 15, 2005

(51) Int. Cl.
*B01D 29/00* (2006.01)
*B01D 39/00* (2006.01)

(52) U.S. Cl. .............. 264/41; 264/45.3; 210/500.37; 210/500.23

(58) Field of Classification Search ............ 264/41, 264/45.3, 209.1, 171.13; 423/23, 150.1, 423/46; 210/500.23, 321.25, 500.37, 500.38, 210/645, 650; 428/315.7; 521/61, 64
See application file for complete search history.

(56) References Cited

U.S. PATENT DOCUMENTS

| | | | |
|---|---|---|---|
| 3,231,530 A | 1/1966 | Prahl | |
| 3,471,597 A | 10/1969 | Schirmer | |
| 3,679,528 A | 7/1972 | Spiegel | |
| 3,719,640 A | 3/1973 | Lee et al. | |
| 3,801,692 A | 4/1974 | Zimmerman | |
| 3,843,761 A | 10/1974 | Bierenbaum et al. | |
| 3,853,601 A | 12/1974 | Taskier | |
| 3,880,966 A | 4/1975 | Zimmerman et al. | |
| 3,951,815 A * | 4/1976 | Wrasidlo | 210/500.27 |
| 4,039,440 A | 8/1977 | Cadotte | |
| 4,051,300 A | 9/1977 | Klein et al. | |
| 4,238,459 A | 12/1980 | Phillips, Jr. et al. | |
| 4,340,482 A | 7/1982 | Sternberg | |
| 4,346,142 A * | 8/1982 | Lazear | 428/315.7 |
| 4,432,875 A * | 2/1984 | Wrasidlo et al. | 210/500.34 |
| 4,557,759 A * | 12/1985 | McGrew et al. | 75/712 |
| 4,900,449 A | 2/1990 | Kraus et al. | 210/651 |
| 4,957,943 A * | 9/1990 | McAllister et al. | 521/64 |
| 5,013,439 A | 5/1991 | Fisher et al. | 210/500.23 |
| 5,085,775 A | 2/1992 | Swamikannu | 210/500.27 |
| 5,098,569 A | 3/1992 | Stedronsky | 210/500.29 |
| 5,130,342 A * | 7/1992 | McAllister et al. | 521/61 |
| 5,294,346 A * | 3/1994 | Donato et al. | 210/645 |
| 5,700,375 A * | 12/1997 | Hagen et al. | 210/651 |
| 6,183,668 B1 * | 2/2001 | Debe et al. | 252/510 |
| 6,881,490 B2 * | 4/2005 | Kambe et al. | 428/447 |

* cited by examiner

*Primary Examiner*—Ana Fortuna
(74) *Attorney, Agent, or Firm*—Madan, Mossman & Sriram, P.C.

(57) ABSTRACT

The invention discloses a method for synthesizing hollow structured freestanding membrane having pore size of 2 to 200 nm which provides long-term stability that makes it viable for many practical applications such as protein separation and drug delivery.

20 Claims, No Drawings

PROCESS FOR THE PREPARATION OF FREE STANDING MEMBRANES

BACKGROUND OF THE INVENTION

1. Field of the Invention

The present invention relates to a novel process for the preparation of gold nanoparticles incorporated freestanding membranes. These membranes can be used in simple membrane permeation experiments to cleanly separate small molecules on the basis of molecular size.

2. Background and Prior Art

The combination of nanoscale inorganic materials with organic polymers has a high potential for future applications such as device technology and drug delivery and has therefore attracted a lot of attention during the last decade. Polymer systems have played important roles as nanotemplates with different morphologies and tunable sizes for nanofabrication of all kinds of inorganic materials, as they can be easily removed after reactions, and can be further modified with different functional groups to enhance their interactions.

There is increasing interest in using synthetic membranes for applications including electronic, optical and mechanical device, drug delivery, and bioencapsulation as well as to do protein separations. Potential advantages of membrane based protein separations include low cost, high speed and high throughput. In addition, membrane based enzyme separations can in principle scaled up for large-scale use in commercial production. Gold nanotubule membranes are ideal model systems to explore how pore size affects the rate and selectivity of protein transport in synthetic membranes. These membranes can also act as extraordinary molecular sieves.

Membranes are widely used in separation techniques. The transport of fluids through membranes takes place by means of different mechanisms, which depend on the structure and nature of the membrane. The most widely used membranes are formed from synthetic or natural organic polymers. Porous membranes contain voids, which are large compared with the size of the molecules transported. In these membranes, the pores are interconnected and the solid materials represent only a small percentage of the total volume of the membrane. The porous membranes available commercially have a pore size of between 0.005 micron and 20 micron. They are made from a great variety of polymers so as to obtain a wide range of rigidities and mechanical strengths. Generally, for separation in the aqueous phase, either hydrophilic membranes or hydrophobic membranes are used, according to the experimental conditions (pH, oxidizing medium), but also according to the type of molecules to be separated. Thus molecules of the hydrophobic type will tend to be adsorbed more on a hydrophobic support. In order to prevent these molecules from being adsorbed, the surface of the hydrophobic support can be modified by incorporating a hydrophilic group or by means of a fine surface deposition of a hydrophilic polymer.

Porous membranes are used as separation membranes in various industrial fields. For example, the membranes are widely used for the preparation of ultra pure water in the field of semiconductor production, the removal of a very small amount of iron contained in cooling water at power plants and filtration or the removal of microorganisms in medical appliances and in the pharmaceutical and food industries. The current trend is one of continuing expansion in the range and volume of the application and use of such membranes. Above all, the demand for porous membranes excellent in heat and chemical resistance is on the increase. Therefore, porous membranes are in demand from which ion fractions, organic substances or the like are eluted in small quantities at high temperatures and which are excellent in heat and chemical resistance.

Significant research efforts have been devoted for the preparation of nanoscale materials within the pores of nanoporous membranes (Charles Martin, *Science*, 1994, 266, 1961; Charles Martin, *Chem. Mat.* 1996, 8, 1739). Because the membranes used contain cylindrical pores of uniform diameter, monodisperse nanocylinders of the desired material whose dimensions can be carefully controlled, are obtained. This template method has been used to prepare wide variety of materials such as polymers, metals, semiconductors and ceramics on a nanoscopic scale.

Self-assembly of reactive amphiphilic block copolymers is used to prepare nanostructured hydrogels with exceptional permeability properties, vesicular structures and planar, freestanding membranes in aqueous solution. Although the underlying block copolymer membranes are two to three times thicker than conventional lipid bilayers they can be regarded as a mimetic of biological membranes and can be used as a matrix for membrane spanning proteins. Surprisingly the proteins remain functional despite the extreme thickness of the membranes and even after polymerization of the reactive block copolymers. The unique combination of block copolymers with membrane proteins allows the preparation of mechanically stable, defect-free membranes and nanocapsules that have highly selective permeability and/or specific recognition sites.

Conventional methods for producing microporous membranes are classified into a wet method and dry method. These methods utilize fillers or wax with a solvent as in wet method, or without the solvent as in dry method, to produce a precursor film. Then a resulting microporous membrane is obtained by forming micro-pores in the precursor film.

There are numerous methods of forming micro-pores, such as in cold and hot stretching methods the precursor film is subjected to a stretching process, and in an extraction method low molecular weight particles are extracted from the precursor film which has been subjected to a biaxial stretching (alternatively, biaxial stretching process can be implemented after the extraction method) to form micropores on the precursor film. Further, the precursor film can be subjected to a corona discharge method followed by a stretching, or it can be etched after being irradiated with high-energy ion-beams as in a track-etching method to obtain microporous membrane. The method utilizing cold or hot stretching process is referred to as a dry process. U.S. Pat. Nos. 3,679,538; 13,801,692 3,843,761; 4,238,459; and 5,013,439 disclose the dry process, while U.S. Pat. Nos. 3,471,597 and 3,880,966 disclose corona discharge process for obtaining a precursor film with pores.

The dry process has an advantage in that it does not utilize environmental hazardous solvents, and hence the method is referred to as a clean process and is widely used in the industry. However, microporous membranes produced by the dry process have pores with undesirable small sizes, and presents the difficulties of adjusting and increasing shape and size of the pores. Further, there is a drawback in that during stretching, maintaining shape of the pores becomes difficult as stretch ratio increases.

The conventional methods for producing microporous membranes utilize polyolefin resin because of its cost and chemical and physical property. Currently, there are numerous researches being carried out to incorporate hydrophilic property to polyolefin resin membranes. The method described by Hoechst Celenese processes the surface of the polyolefin resin membrane with surfactants, and other methods described by U.S. Pat. Nos. 3,231,530; 3,853,601; 3,951,815; 4,039,440; and 4,340,482 integrates monomers having high hydrophilic property or processes the polyolefin resin membranes with chemicals. However, because of simultaneously occurring chemical reactions, the molecular weight of polymer decreases and the structural integrity of the polyolefin membrane weakens. Further, due to the complexity of the processes involved, it is difficult to mass-produce the polyolefin membranes having hydrophilic property.

Other methods for integrating hydrophilic property to the polyolefin membranes are further described by U.S. Pat. Nos. 4,346,142; 5,085,775 and 5,294,346. These methods use monomers of acrylic acid having hydrophilic property and polymers of polyethylene oxide by grafting them on to the surface of polymer membranes utilizing corona or plasma method. However, due to the plasma's unique properties characterized by having a wide range of energy distribution and a high degree of environmental susceptibility, it is difficult to obtain a uniformed porosity. Further, obtaining a polyolefin membrane having excellent physical properties is made difficult by the degradation of its mechanical property due to the damage to the surface of the film caused by the reactions accompanying the method.

The polyaniline class of conducting polymers has been shown to be one of the most promising and most suited conducting polymers for a broad range of commercial applications. The polymer has excellent environmental stability and offers a simple, one-step synthesis. In addition, the processability of this class of polymers requires improvement. Although polyaniline is a soluble polymer, it has been noted that the solutions tend to be unstable with time. (E. J. OH et al, *Synth. Met.*, 1993, 55–57, 977). Solutions of for example the polyaniline in the non-doped form tend to gel upon standing. Solutions greater than 5% solids concentration tends to gel within hours limiting the applicability of the polymer. It is desirable to devise methods of increasing the electrical conductivity of the doped polyaniline and to enhance the processability of these systems to allow broader applicability.

Other asymmetrical polymer materials obtained from mixtures of monomers exist. Their functioning is described, for example, in Chapter I, entitled "Physical Chemistry of Membranes", page 19 of Membrane Science and Technology, edited by Y. Osada and T. Nakagawa. "The hydrophobic domain prevails on one side of the membrane, where in contact with the hydrophobic substrate, and the hydrophilic domain prevails on the other side of the membrane. A flow reversal effect has been observed for such asymmetric membranes when the concentration dependence of the diffusion coefficient through a hydrophilic membrane is marked. A high permeability coefficient is obtained when the hydrophilic penetrant permeates the membrane from the hydrophilic side of the asymmetric membrane. On the other hand, the permeability coefficient is low when the hydrophilic penetrant permeates from the hydrophobic domain side".

Hydrophobic porous membranes are highly resistant to chemical substances and do not swell in water. On the other hand, they function only under pressure, and even under these conditions they do not allow the water to pass sufficiently. It is therefore necessary to treat these membranes in order for their pores to have a hydrophilic surface.

Numerous known methods for making the surface of hydrophobic membranes hydrophilic are described in "Synthetic Polymeric Membranes, a Structural Perspective", Second Edition, by Robert E Kesting, published by Wiley-Interscience (New York, 1985).

For example, U.S. Pat. No. 5,098,569 describes a membrane support with a modified surface, in which a monomolecular layer of a hydrophilic polymer derived from cellulose is grafted onto a porous hydrophobic membrane. The membrane obtained is stable in ethanol.

Polyacrylonitrile membranes are naturally rather hydrophobic but are not lipophobic. For certain specific applications, it is necessary to increase their lipophobia so as to avoid clogging by organic compounds. They are electrostatically neutral and possess higher physical resistance to alkalis than cellulose and its derivatives.

A microporous, hollow fiber is a polymeric capillary tube having an outside diameter of less than or equal to 1 mm, and whose wall functions as a semi permeable membrane. The fibers are useful in separation processes involving transport mainly through sorption and diffusion. Such processes include dialysis, hemodialysis, ultrafiltration, hemofiltration, plasma filtration, blood separation drug release in artificial organs and water filtration where ultra-pure water is needed such as in the electronic and pharmaceutical industries. Each of these applications has various requirements including pore size, strength, biocompatibility, cost and speed of production and reproducibility.

Given the varying uses to which this fiber may be applied, it is highly desirable that the hollow fiber membrane have as little leachable impurities as possible in water, blood, from 0% to saturated solutions of NaCl in water, and other similar type of aqueous solutions. For certain applications, it may also be desired that the membranes be easily or immediately wettable by water, blood and other types of aqueous solutions without the need for costly polymer additives, post fiber-formation treatments with wetting agents or both. In other applications, it would be highly desirable for these membranes to remove endotoxin from the solution to be filtered. In still other applications, it may be desirable to be able to repeatedly autoclaved without the loss of the rewetting characteristic.

Early hollow fibers have included regenerated cellulose material and modified polyacrylonitrile material. However, it is difficult to control the porosity and pore size of these fibers, and for some applications, composite membranes consisting of an ultra-thin layer contiguous with a more porous substrate are needed to provide the necessary strength.

Early hollow fiber membranes have also been prepared from hydrophobic polymers such as polysulfones, aromatic polyamides and polyimides, and polyamide-imides. However, the hydrophobic nature of these polymers presents difficulties with wetting these membranes when used in aqueous systems. Therefore, hydrophilic polymers such as polyvinyl alcohol, polyvinyl acetate co-polymers, polyvinylpyrrolidone and polyvinylpyrrolidine have typically been incorporated directly into the fibers to achieve a hydrophilic fiber that wets easily. Alternatively, polyethylene glycol, glycerol and/or a variety of surfactants have been incorporated directly into the fibers or used post-fiber formation to achieve wettability.

In an attempt to overcome the difficulties and limitations of the prior art, Klein et al., U.S. Pat. No. 4,051,300 discloses a process for the preparation of hollow microporous fibers capable of withstanding from 600 psi to 2000 psi applied pressure without collapse. The fibers are prepared by a solution spinning process. This process comprises extruding a polymer solution of a first fiber forming polymer and a second, hydrophilic polymer through the outer annulus of a coextrusion die, providing a precipitating liquid miscible with the polymer solvent through an inner or center orifice in the coextrusion die. The precipitating liquid forms an inner liquid core surrounded by the polymer solution. The precipitation liquid causes the annular polymer solution to precipitate into a hollow fiber. In further processing, the fiber is washed free of the residual solvents and nonsolvents.

U.S. Pat. No. 4,432,875 to Wrasidlo et al., discloses reverse osmosis fiber membranes made from specific polyimide structures. Baked onto the membrane is a polymeric, high molecular weight surfactant. The polymeric surfactant apparently takes the place of the hydrophilic polymer Heilmann reference and is used to increase the wettability of the resultant fiber membrane. The fiber produced using the Wrasidlo process, however, is limited to sheet membranes that have a porosity significantly different than microporous hollow fiber membranes. Further, the "baking on" of the surfactant in Wrasidlo results in a fiber that is costly to manufacture, thus making the fiber's use economically impractical for smaller companies.

U.S. Pat. No. 3,719,640 to Le et al., discloses linear polymers of polyamide-imides having a specific formulation containing a quaternizable nitrogen atom. When nitrogen is quaternized, the polymer becomes hygroscopic and may be used as separatory membranes in such processes as desalination.

U.S. Pat. No. 4,900,449 to Kraus et al., discloses the use of polyimide polymers for pleated flat sheet type membranes. The membranes and process described are limited in use to flat sheet membranes for water filtration applications. Such membranes have less than one-half the surface area available for filtration as the filter membranes of the present invention.

A hollow fiber membrane that could be applied across a wide range of applications would provide a decided advantage over early hollow fiber membranes. A new and useful hollow fiber membrane is needed that incorporates a low molecular weight surfactant which does not require the use of high temperatures to ensure the incorporation of the surfactant into and/or onto the membrane resulting in a membrane that can be autoclaved repeatedly without the loss of the rewetting characteristic and one which does not rely on glycerol for rewettability.

In addition, a new and useful membrane is needed that is chemically inert to blood and water solutions, or both, within the normal blood pH range of 7.35–7.45 and also be rewettable after repeated sterilizations. In cases where the membrane will be used for medical applications or applications involving the semiconductor industry it would also be desirable that leachable additives such as surfactants and/or hydrophilic polymers are completely absent from the resultant fiber because residual toxic substances are a major concern. In cases where the membrane will be in contact with human blood, it is also highly desirable that the membrane be biocompatible in that it will not activate complement and that it have high sieving coefficients for middle molecules (5,000 daltons to 25,000 daltons molecular weight) such as beta. Sub.2 microglobulin and myoglobin.

Further, the relatively slow rate at which related art hollow fibers are produced results in costly to manufacture microporous hollow fibers. Therefore, a new and useful process is also needed to produce the membranes of the present invention to reduce significantly the manufacture time thus ensuring that a low cost hollow fiber is available to large and small companies alike.

Incorporating nanoparticles into the polymer matrices using external porous membranous templates is a well-known procedure (Liu et al Prog. Polymer Sci., 2003, 28, 5; Kickelbick, Prog. Polymer Sci., 2003, 28, 83). A new method of in situ generation of nanoparticles in the polymer matrix during the polymerization process itself opens up wider possibility of macromolecular applications (Voskerican et al Biomaterials., 2003, 24, 1959). Preliminary attempts have been tested positive for the generation of Au nanoparticles in a polypyrrole matrix (Selvan et al Adv. Mat., 1998, 10, 132).

Inorganic-organic hybrid materials have also been prepared by dispersing powdered or particulate forms of inorganic materials within various polymeric matrices. Although the inorganic—organic hybrid materials are homogeneously mixed, they contain separate inorganic and organic phases on a macromolecular scale. These separate phases frequently give rise to the inorganic material's migration within and/or leaching out of the polymeric matrix. Furthermore, the inorganic phases of these inorganic-organic hybrid materials can be separated from the polymer matrix by simple mechanical processes or by solvent extraction of the polymer. Consequently, upon exposure to certain temperatures or solvents, the inorganic phases of these hybrids can migrate and dissipate out of or accumulate in various regions within the polymeric matrix, reducing its useful life.

Each of the above inorganic-organic hybrid materials were made either (1) by melting and then mixing the inorganic and organic phases into a homogeneous mixture which was then cured, extracted, or dried or (2) by dissolving the polymer and inorganic material together in a solvent in which both materials were miscible, mixing to produce a homogeneous solution, and then evaporating the solvent to extract the hybrid material. The resulting inorganic-organic hybrid materials are essentially homogeneous macromolecular blends, which have separate inorganic and organic domains, which range from nanometers to tens of micrometers in size. All of the above composites are fabricated by using inorganic materials, typically naturally occurring minerals, which are in thermodynamically stable metallic forms, such as metal oxides, metal nitrides, and zero-valent metals.

These inorganic-organic hybrid materials suffer from a number of drawbacks, which limit their utility. For example, the size of the domain that the inorganic materials assume within the hybrid depends on the particle size of the inorganic material particulate or fibre used in making the hybrid. In addition, the homogeneity of the inorganic-organic hybrid material largely depends on either the solubility of the inorganic material in the polymeric melt or on the solubility of the inorganic material in the solvent used to solubilize the polymeric material. Furthermore, the properties and molecular structures of these hybrids depend greatly on the methods used to extrude, cast, or dry the solid hybrid material from the melt or solubilized mixtures, which gives rise to significant, undesirable, and frequently uncontrollable batch-to-batch and regional variations. Because of the problems associated with migration and leaching of the inorganic phase in inorganic organic hybrids, hybrid materials containing inorganic phases having greater stability have been developed. These materials rely on physically entrapping large interpenetrating macromolecular networks of inorganic materials in the polymeric chains of the organic material.

For these and other reasons, there remains a need for inorganic-organic polymer composites and for methods of preparing these inorganic-organic polymer composites, which do not suffer from the above-described limitations. The present invention is directed to meeting this need.

The above-mentioned methods teach us the different methods of fabrication of various nanosized inorganic materials into the polymer matrices and their exciting application prospects. But all these methods have certain limitations and their major drawbacks are:
1. Large-scale synthesis is not possible
2. Uniform size control is tough
3. Complex experimental conditions
4. High temperature treatment
5. Require more manoeuvring
6. Not a robust system
7. Not cost effective
8. Stability of the system is low
9. There is an upper limit to scaling in terms of mass production
10. Possibility of contamination To the best of our knowledge, the present invention is the first of its kind that involves a simple synthesis procedure for the formation of free standing membranes incorporated in situ with gold nanoparticles, the advantage of which lies in its exciting applications. The present invention is directed towards the formation of freestanding gold membranes consisting of Au nanoparticles surrounded by the network of polymer. Composites consisting of a polymer matrix filled with nanosized particles are of particular interest because of their long-term stability and they offer new routes to influencing the interactions that may take place between the matrix and the gold nanoparticle.

OBJECT OF THE INVENTION

The main object of this invention, to prepare in situ the freestanding polymer membranes incorporated with gold nanoparticles.

Yet another object of this invention to produce gold nanoparticles as well as the polymer membrane in-situ without any further processing.

Another object of this invention to prepare gold nanoparticles of various concentrations incorporated in situ in these freestanding membranes.

Another objective of this invention, the initial monomer dianiline molecule is oxidatively polymerized to polyaniline by in situ reduction with acidic pH aqueous chloroaureate ions which themselves reduced form to gold nanoparticles.

In another object of this invention the gold ions dissolved in aqueous solution at a pH of 3 is mixed under static ambient conditions with the organically dissolved monomer dianiline.

Another objective of this invention, the freestanding polymer membrane forms at the liquid-liquid interface of the two solutions within 3 hours under ambient conditions.

A further object of this invention, thickness of the as-formed membranes controlled by mixing equimolar concentrations of acidic pH aqueous tetrachloroauric acid solution and the organically dissolved dianiline solution.

Yet another objective of this invention, the membranes are thicker as well as flexible for higher concentrations of gold nanoparticles.

In another objective of this invention, the as-prepared membranes are stable for long-term use.

Another object of this invention, different chain lengthed monomer dianiline molecules are oxidatively polymerised to more inter-conjugated polyaniline like complex structures.

Yet another object of this invention, to prepare porous flexible freestanding membranes.

A further object of this invention, to leach out the gold nanoparticles from the membrane using iodine treatment.

The object of this invention, gold nanoparticles could be leached out thoroughly using iodine solution within 4–5 hours.

Another object of this invention, polymer hollow structures or capsules are formed when the gold nanoparticles are leached out.

In yet another objective of this invention, these polymer hollow structures are biocompatible; thereby proteins and enzymes could well be immobilized.

SUMMARY OF THE INVENTION

The invention discloses a novel method for synthesizing freestanding gold nanoparticles encapsulated polymer membranes. The freestanding nature and the long-term stability of this polymer covered gold nanoparticles membrane makes it viable for many practical applications such as protein separation and drug delivery. Hollow structured membranes could as well be prepared simply by leaching out the Au nanoparticles using iodine treatment. The hollow pore size distribution corresponds to the dimensions of the Au nanoclusters initially present in the membrane.

DETAILED DESCRIPTION OF THE INVENTION

Accordingly, the present invention provides a new process for the preparation of hollow structured freestanding membrane having pore size of in the range of 2 to 200 nm for use in protein/enzyme immobilization and drug delivery, said process comprises the steps:
(a) mixing a monomer with aqueous chloroaurate ions in an organic solvent;
(b) polymerizing the mixture of step (a) for a time period in the range of 3 to 5 hours to obtain gold nanoparticles encapsulated free standing membrane,
(c) treating the free standing membrane of step (c) with iodine solution for a time period in the range of 3 to 7 hours to leach out the gold nano particles thereby obtaining the hollow structured free standing membrane.

In another embodiment of the present invention the monomer is diamine having ethereal linkages.

In another embodiment of the present invention the diamine used is 2-bis (4-aminophenoxy) diethyl ether.

Still in another embodiment of the present invention the solubility of monomer in the organic solvent is in the range of $10^{-1}$M to $10^{-5}$M.

In another embodiment of the present invention the organic solvent used is hydrocarbons or substituted hydrocarbons.

Yet in another embodiment of the present invention the hydrocarbon is selected from hexane or benzene.

In one another embodiment of the present invention the substituted hydrocarbon is toluene.

In another embodiment of the present invention the pH value of the mixture of step (a) is not greater than 3.

Still in another embodiment of the present invention the concentration of chloroaurate ions and the monomer is greater than $10^{-3}$M.

In another embodiment of the present invention the concentration of chloroaurate ions is almost equal to the concentration of the monomer.

In another embodiment of the present invention the polymerisation of the monomer is carried out at liquid-liquid interface of organic and aqueous phases.

Yet in another embodiment of the present invention the membrane has uniform pore size in the range of 2 to 200 nm.

Still in another embodiment of the present invention the as-prepared freestanding membranes is stable for a period of about one year.

In one another embodiment of the present invention said freestanding membrane contains polyaniline which is formed by cross linking of diamine monomers.

Yet in another embodiment of the present invention leaching of gold nano particles is performed by using iodine-iodide solution.

In another embodiment of the present invention the iodine-iodide solution is prepared by dissolving iodine in potassium iodide solution.

Still in another embodiment of the present invention the leaching of gold nanoparticles is performed by floating thoroughly washed free standing membrane in the iodine-iodide solution to obtain hollow structured membrane.

Yet in another embodiment of the present invention the gold nanoparticles are leached out in a time period in the range of 4–5 hours.

In another embodiment of the present invention, provides a new synthesis procedure for the preparation of free standing gold membranes encapsulated in a polymer matrix. Preliminary experiments of the present invention using the solutions of tetrachloroauric acid ($HAuCl_4$) and an aromatic diamine have demonstrated the in situ formation of polyaniline and Au nanoparticles.

In another embodiment of the presnet invention, a simple organic/aqueous liquid-liquid interface has been utilized to synthesize as well as cast Au nanocrystals into a polymer membrane in situ. This invention is clearly distinguished from others where the metal nanocrystals synthesized ex situ are obtained in the form of films at the air-liquid or liquid-liquid interfaces.

Still in another embodiment of the present invention, two immiscible liquids like water and an organic solvent are brought into contact, without any additional input of energy i.e. under static conditions; an interface is formed between the phases. If the two phases are initially not in equilibrium with each other, mass transfer will take place across the interface forming thin film like structures. Nanometer and micrometer sized particles adsorbed at these interfaces are ubiquitous in technological applications, as well as in biological constructs (Zhang et al *Environ. Sci. Technol.*, 2003, 37, 1663; Gittins and Caruso *J. Phys. Chem. B.*, 2001, 105, 6846). Furthermore, nanocrystals anchored to surfaces in the form of a film are considered to be important because of their potential use in nanodevices (Khomutov et al *Microelect. Engn.*, 2003). Yet in another embodiment of the present invention, under ambient static conditions, aqueous chloroauric acid is mixed with the aromatic diamine in chloroform. Due to the acidic pH of the mixture, the aniline group in the diamine molecule points towards the aqueous phase i.e. interface of both liquids while its hydrocarbon part points towards the organic phase like a surfactant. Due to the electrostatic interaction between chloroaurate ions and aniline group in the diamine molecule, chloroaurate ions tend to move towards the aqueous/organic interface, where the density of amine functional groups is more. Thus, at the aqueous/organic interface, the respective reduction of both chloroaurate and the aromatic diamine molecule takes place, leading to the formation of Au and polyaniline. The term "polymer", as used in the specification and claims, means an organic material consisting of repeated chemical units joined together, usually in a line, like beads on a string. Whereas monomers, like the above said aromatic diamines, are the basic building blocks of polymers.

These monomers by the so-called oxidative polymerisation get transformed into composite polymer membranes. Chemical oxidative polymerization of aniline in micellar system also lead to an acceleration of polymerization rate and enabled the resulted polyaniline soluble in water or organic solvents (Kuramoto, *Japanese Patent*, 1998; Kuramoto and Genies *Synthetic Metals*, 1994, 68, 191; Shigehito Sagisaka et al, *Thin Solid Films*, 1995, 271, 138).

In general, a cross-linked polymer could only form with the availability of more than one functional group of monomers. As the diamine molecule necessarily satisfies this general criterion of having two terminal aniline groups, polyaniline, the cross-linked polymer forms capping around the as-formed gold nanoparticles, thus forming the resultant freestanding membrane.

Yet in another embodiment of the present invention, the encapsulation of gold nanoparticles into the polymer network makes the membrane more stable and stretchable to an extent. The whole process for the formation of this membrane is completed within 3 hours. After 3 hours, a homogeneously formed dark purple colored freestanding membrane is clearly at the aqueous/organic interface, indicating the completion of the reaction.

Still in another embodiment of the present invention, the stability of the membrane is more than 1 year.

EXAMPLES

The invention may be further illustrated with following examples:

Example 1

This example illustrates the process for the preparation of large area freestanding polymer membranes incorporated in situ with gold nanoparticles. A 100 mL aqueous solution of $10^{-3}$ M chloroauric acid was added with $10^{-3}$ M aromatic diamine dissolved in chloroform under static ambient experimental conditions. This mixture is left static for 3–5 hours. After 5 hours, a freestanding polymer membrane is formed at the liquid-liquid interface between the organic and aqueous phases. The dark purple color of the membrane itself indicates that the gold nanoparticles are incorporated into them. The as-formed membrane is transformed to Si (III) and glass substrates for further characterization. An average particle size of a few microns was observed for the incorporated gold nanoclusters in the polymer membrane using a high resolution SEM. Optical absorption measurements also show the 520 nm surface plasmon band of the gold nanoparticles when taken in the reflectance mode. TEM measurements further indicate the capping of gold nanoclusters in the network of the polymer membrane.

Example 2

This example illustrates the process for the preparation of large area freestanding polymer membranes incorporated in situ with gold nanoparticles. A 100 mL aqueous solution of $10^{-2}$ M chloroauric acid was added with $10^{-2}$ M aromatic diamine dissolved in chloroform under static ambient experimental conditions. This mixture is left static for 3–5 hours. After 5 hours, a freestanding thicker polymer membrane is formed at the liquid-liquid interface between the organic and aqueous phases. The dark purple color of the membrane itself indicates that the gold nanoparticles are incorporated into them. The as-formed membrane is transformed to Si (III) and glass substrates for further characterization. An average particle size of a few microns was observed for the incorporated gold nanoclusters in the polymer membrane using a high resolution SEM. Optical absorption measurements also show the 520 nm surface plasmon band of the gold nanoparticles when taken in the reflectance mode. TEM measurements further indicate the capping of gold nanoclusters in the network of the polymer membrane.

Example 3

This example illustrates the process for the preparation of large area freestanding polymer membranes incorporated in situ with gold nanoparticles. A 100 mL aqueous solution of $10^{-3}$ M chloroauric acid was added with $10^{-3}$ M 2-bis (4-aminophenoxy) diethylether dissolved in chloroform under static ambient experimental conditions. This mixture is left static for 3–5 hours. After 5 hours, a freestanding thicker polymer membrane is formed at the liquid-liquid interface between the organic and aqueous phases. The dark purple color of the membrane itself indicates that the gold nanoparticles are incorporated into them. The as-formed membrane is transformed to Si (111) and glass substrates for further characterization. An average particle size of a few micron was observed for the incorporated gold nanoclusters in the polymer membrane using a high resolution SEM. Optical absorption measurements also show the 520 nm surface plasmon band of the gold nanoparticles when taken in the reflectance mode. TEM measurements further indicate the capping of gold nanoclusters in the network of the polymer membrane.

Example 4

This example illustrates the process for the preparation of large area freestanding polymer membranes incorporated in situ with gold nanoparticles. A 100 mL aqueous solution of $10^{-3}$ M chloroauric acid was added with $10^{-3}$ M 2-bis (4-aminophenoxy) diethylether dissolved in chloroform under static ambient experimental conditions. This mixture is left static for 3–5 hours. After 5 hours, a freestanding thicker polymer membrane is formed at the liquid-liquid interface between the organic and aqueous phases. The dark purple color of the membrane itself indicates that the gold nanoparticles are incorporated into them. The as-formed membrane is transformed to Si (111) and glass substrates for further characterization. An average particle size of a few micron was observed for the incorporated gold nanoclusters in the polymer membrane using a high resolution SEM. Optical absorption measurements also show the 520 nm surface plasmon band of the gold nanoparticles when taken in the reflectance mode. TEM measurements further indicate the capping of gold nanoclusters in the network of the polymer membrane.

Example 5

This example illustrates the leaching of gold nanoparticles from the as-prepared large area freestanding polymer membranes. The preparation procedure of the polymer membranes is the same as illustrated in examples 1 and 2. This polymer membrane is carefully removed from the liquid-liquid interface and washed thoroughly for 4–5 times with distilled water. This is to be done to remove the surface impurities present in the as-formed membrane. The iodine solution is prepared by mixing small amount of iodine in aqueous potassium iodide solution. The thoroughly washed membrane is made to float on this iodine solution for 4–5 hours. After 5 hours, the membrane becomes stiffer indicating the complete removal of gold nanoparticles. Again, this membrane is thoroughly washed 4–5 times with distilled water and transferred onto Si (III) and glass substrates for further analysis. A homogeneously hollow polymer or capsuled structure is clearly visible in high resolution SEM indicating the complete removal of gold nanoparticles from the membrane. TEM measurements also indicate a hollow networked polymer structure. The size of the hollow core in this polymer structure corresponds to the size of the gold nanoclusters removed from the membrane. The few micron sized hollow cores corroborated well with the size of the gold nanoclusters incorporated in the as-prepared membrane. Optical absorption measurements also show the dampening of the 520 nm surface plasmon peak of the gold nanoparticles.

Advantages of our process:
1. Free standing Au nanoparticles incorporated membranes
2. Homogeneous distribution of Au nanoparticles in the membrane
3. Require less manoeuvring
4. Potential future applications such as drug delivery etc
5. Cost effective/Economical system for the industry
6. High stability of the Au nanoparticles formed
7. Controlled thickness of the membranes
8. No upper limit to scaling in terms of mass production
9. Preparation of large area membranes is plausible
10. Easy leaching of Au nanoparticles using iodine treatment is possible
11. Hollow fibres with long term stability is obtainable

The invention claimed is:
1. A process for the preparation of hollow structured freestanding membrane having pore size of in the range of 2 to 200 nm said process comprises the steps:
    a) mixing a monomer with aqueous chloroaurate ions in an organic solvent;
    b) polymerizing the mixture of step (a) for a time period in the range of 3 to 5 hours to obtain gold nanoparticles encapsulated free standing membrane,
    c) treating the free standing membrane of step (c) with iodine solution for a time period in the range of 3 to 7 hours to leach out the gold nano particles thereby obtaining the hollow structured free standing membrane.
2. A process as claimed in claim 1, wherein step (a) the monomer is diamine having ethereal linkages.
3. A process as claimed in claim 2, wherein the diamine used is selected from a group comprising 2-bis (4-aminophenoxy) diethyl ether and DAEE ($C_{16}H_{20}N_2O_3$).
4. A process as claimed in claim 2, wherein the solubility of monomer in the organic solvent is in the range of $10^{-1}$ M to $10^{-5}$ M.
5. A process as claimed in claim 1, wherein in step (a) the organic solvent used is hydrocarbons or substituted hydrocarbons.
6. A process as claimed in claim 5, wherein the hydrocarbon is selected from hexane or benzene.
7. A process as claimed in claim 5, wherein the substituted hydrocarbon is toluene.
8. A process as claimed in claim 1, wherein the pH value of the mixture of step (a) is not greater than 3.

9. A process as claimed in claim 1, wherein the concentration of chloroaurate ions and the monomer is greater than $10^{-3}$ M.

10. A process as claimed in claim 1, wherein the concentration of chloroaurate ions is almost equal to the concentration of the monomer.

11. A process as claimed in claim 1 wherein in step (b), polymerisation of the monomer is carried out at liquid-liquid interface of organic and aqueous phases.

12. A process as claimed in claim 1, wherein the membrane has uniform pore size in the range of 50 to 100 nm.

13. A process as claimed in claim 1, wherein the as-prepared freestanding membranes are stable for a time period of several years.

14. A process in accordance with claim 1, wherein said freestanding membrane contains polyaniline which is formed by cross linking of diamine monomers.

15. A process as claimed in claim 1, wherein leaching of gold nano particles is performed by using iodine-iodide solution.

16. A process as claimed in claim 15, wherein the iodine-iodide solution is prepared by dissolving iodine in potassium iodide solution.

17. A process as claimed in claim 1 wherein prior to step (c), the free standing membrane is optionally washed with distilled water.

18. A process as claimed in claim 17, wherein the leaching of gold nanoparticle is performed by floating thoroughly washed free standing membrane in a iodine-iodide solution to obtain hollow structured membrane.

19. A process as claimed in claim 1, wherein the gold nanoparticles are leached out in a time period in the range of 4–5 hours.

20. A process as claimed in claim 1, wherein the hollow structured free standing membranes have application in protein/enzyme immobilization, whole cell culture, biominerals growth, drug delivery.

* * * * *